(12) United States Patent
Dzafic

(10) Patent No.: US 9,882,384 B2
(45) Date of Patent: Jan. 30, 2018

(54) ENERGY DISTRIBUTION SYSTEM AND METHOD FOR OPERATING SAME

(71) Applicant: SIEMENS AKTIENGESELLSCHAFT, Munich (DE)

(72) Inventor: Izudin Dzafic, Sarajevo (BA)

(73) Assignee: Siemens Aktiengesellschaft, Munich (DE)

( * ) Notice: Subject to any disclaimer, the term of this patent is extended or adjusted under 35 U.S.C. 154(b) by 363 days.

(21) Appl. No.: 14/764,646

(22) PCT Filed: Jan. 30, 2013

(86) PCT No.: PCT/EP2013/051752
§ 371 (c)(1),
(2) Date: Jul. 30, 2015

(87) PCT Pub. No.: WO2014/117826
PCT Pub. Date: Aug. 7, 2014

(65) Prior Publication Data
US 2015/0380933 A1 Dec. 31, 2015

(51) Int. Cl.
*H02J 3/00* (2006.01)
*G05B 15/02* (2006.01)
(Continued)

(52) U.S. Cl.
CPC ............... *H02J 3/00* (2013.01); *G05B 15/02* (2013.01); *H02J 3/06* (2013.01); *H02J 13/0006* (2013.01);
(Continued)

(58) Field of Classification Search
CPC ............... H02J 3/00; H02J 3/06; G05B 15/02
(Continued)

(56) References Cited

U.S. PATENT DOCUMENTS

| 6,018,449 A | 1/2000 | Nelson et al. |
| 2012/0029720 A1 | 2/2012 | Cherian et al. |
| 2012/0143385 A1 | 6/2012 | Goldsmith |

FOREIGN PATENT DOCUMENTS

WO  WO 2014057304 A1 * 4/2014 ............... H02J 3/46

* cited by examiner

*Primary Examiner* — Ziaul Karim
*Assistant Examiner* — Joshua Sanders
(74) *Attorney, Agent, or Firm* — Laurence Greenberg; Werner Stemer; Ralph Locher

(57) ABSTRACT

In an energy distribution system, energy is fed through substations into subnetworks and the distribution is monitored by a central device superordinate to the substations. At least one substation is operated in an optimization mode for optimizing the operation of the entire energy distribution grid. The substation thereby investigates a modification action which could be performed by the substation in its subnetwork for the effect of the modification action on the operating state of the entire energy distribution system. The substation receives substation-individual sensitivity values, which indicate the change in the local operating state in the subnetwork assigned to the respective other substation if the modification action were to be implemented. The substation operated in the optimization mode checks, based on the sensitivity values, whether the modification action would result in an improvement of the operating state for the entire energy distribution grid.

13 Claims, 9 Drawing Sheets

(51) Int. Cl.
*H02J 3/06* (2006.01)
*H02J 13/00* (2006.01)

(52) U.S. Cl.
CPC ......... *H02J 2003/007* (2013.01); *Y02E 40/76* (2013.01); *Y02E 60/723* (2013.01); *Y02E 60/76* (2013.01); *Y04S 10/16* (2013.01); *Y04S 10/545* (2013.01); *Y04S 40/22* (2013.01)

(58) Field of Classification Search
USPC ........................................................ 700/295
See application file for complete search history.

ENERGY DISTRIBUTION SYSTEM AND METHOD FOR OPERATING SAME

BACKGROUND OF THE INVENTION

Field of the Invention

The invention relates to a method for operating an energy distribution system in which electric energy is fed into subsystems through substations and the distribution of the energy is monitored using a central device that is superordinate to the substations.

Energy distribution systems today are usually monitored and controlled centrally. The central devices that are customary for monitoring and control require a multiplicity of data in order to ensure reliable operation of the energy distribution system. It is correspondingly complex for the central devices to perform optimization for the operation of the whole energy distribution system and to quickly identify advantageous reconfiguration of the energy distribution system, for example, when the operating situation suddenly changes.

BRIEF SUMMARY OF THE INVENTION

The invention is therefore based on the object of specifying a method for operating an energy distribution system that can be used to achieve reliable operation and the best possible overall state of the energy distribution system.

The invention achieves this object by means of a method having the features according to the independent claim(s). Advantageous embodiments of the method according to the invention are specified in the dependent claims.

Accordingly, the invention provides for at least one of the substations to be operated in an optimization mode in which it optimizes the operation of the whole energy distribution system by examining a modification action, which the substation could perform in the subsystem associated therewith, for its effect on the operating state of the whole energy distribution system, wherein the substation operated in optimization mode receives from the substation(s) affected by the modification action or from all substations a respective substation-individual sensitivity value that indicates the change in the local operating state in the subsystem associated with the respective other substation if the modification action were to be executed in the subsystem of the substation operated in optimization mode, and the substation operated in optimization mode uses the received sensitivity values to check whether the modification action would lead to an improvement in the operating state for the whole energy distribution system.

An essential advantage of the method according to the invention can be seen in that the energy distribution system can be reconfigured automatically. Owing to the suitability, provided according to the invention, of at least one of the substations for being able to automatically check whether an alteration in the system configuration is advantageous, the central device can be relieved of burden and an optimum system configuration can be achieved more quickly and more simply than would be possible in the case of central optimization by the central device alone. Although there may be additional provision for the incorporation of a central device, this is not absolutely necessary in the case of the energy distribution system according to the invention, since the substations—or at least one of them—can check their resources for supplying energy to subsystems or subsections themselves and can perform reconfiguration themselves. It is also possible to reduce the volume of data to be transmitted to a central device and hence further risks of error.

So that the substation operated in optimization mode can establish simply and quickly whether a modification action has a positive effect, it is considered to be advantageous if it sums the substation-individual sensitivity values and a sensitivity value of its own, which describes the influence of the modification action on its own subsystem, to form an alteration value V, in accordance with:

$$V = \sum_{i=1}^{n} k_i \frac{\partial Fl_i}{\partial C} \Delta C$$

where n describes the number of substations, $\delta Fl_i/\delta C$ describes a substation-individual sensitivity value, which is based on the extent of the alteration, for the i-th substation, $\Delta C$ describes the extent of the alteration of the modification action and $k_i$ describes a substation-individual weighting value that indicates the influence of the i-th substation on the total state value. The alteration value V is a measure of whether and to what extent $\Delta C$ the modification action is worthwhile overall for the energy distribution system.

Alternatively or additionally, the substation operated in optimization mode can use the substation-individual sensitivity values and a sensitivity value of its own, which describes the influence of the modification action on its own subsystem, to form a total state value that describes the operating state of the whole energy distribution system, in accordance with:

$$Fg = Fl + \sum_{i=1}^{n} k_i \frac{\partial Fl_i}{\partial C} \Delta C$$

where Fg indicates the total state value following performance of the modification action and Fl indicates the total state value before performance of the modification action. A comparison of the two total state values Fg and Fl can then be used to establish whether and to what extent the modification action is worthwhile overall for the energy distribution system.

By way of example, the substation-individual sensitivity values may be values
- that indicate the ratio between the energy that is consumed by the loads connected to the subsystem of the respective substation and the energy lost in the respective subsystem or
- that indicate the range of variation in the voltage in the subsystem associated with the respective substation or
- that indicate the range of variation in the frequency of the voltage in the subsystem associated with the respective substation.

The substation operated in optimization mode can execute the modification action immediately if it establishes that the modification action leads to an improvement in the operating state for the whole energy distribution system.

Alternatively, provision may be made for the substation operated in optimization mode—if it establishes that the modification action would lead to an improvement in the operating state for the whole energy distribution system—to send an enquiry to the superordinate central device that is used to enquire whether the modification action is intended to be executed.

Preferably, following reception of the enquiry the superordinate central device will use further data, which are not available to the enquiring substation, to check whether the modification action is intended to be executed, and will send a confirmation signal to the enquiring substation if this is the case.

In respect of the method overall, it is considered to be particularly advantageous if the substation operated in optimization mode sends to the substation(s) affected by the modification action or to all substations an enquiry signal that is used to define the modification action that is intended to be executed in the subsystem of the substation operated in optimization mode, the substations each check what influence the planned modification action would have on their own subsystem, produce a substation-individual sensitivity value that describes this influence and send the substation-individual sensitivity value to the substation operated in optimization mode, and the substation operated in optimization mode receives the substation-individual sensitivity values from the remainder of the substations and uses them to produce a total state value that describes the operating state of the whole energy distribution system.

The total state value used for the whole energy distribution system is preferably a value that indicates the ratio between the energy consumed by the loads connected to the energy distribution system and the energy lost in the energy distribution system or the range of variation in the voltage in the energy distribution system or the range of variation in the frequency of the voltage in the energy distribution system.

In order to form the substation-individual sensitivity values, the substations preferably use load and/or topology data that relate to the respective subsystems supplied with energy or to the whole energy distribution system. The load and/or topology data are interchanged by the substations preferably with one another and/or with the central device.

The invention additionally relates to an energy distribution system having at least two substations, which can each supply energy to a subsystem of the energy distribution system, and having a central device that is superordinate to the substations.

In this regard, the invention provides for at least one of the substations to be suitable for being operated in an optimization mode in which it optimizes the operation of the whole energy distribution system by examining a modification action, which the substation could perform in the subsystem associated therewith, for its effect on the operating state of the whole energy distribution system by receiving from all or at least from the substation(s) affected by the modification action a respective substation-individual sensitivity value that indicates the change in the local operating state in the subsystem associated with the respective other substation if the modification action were to be executed in the subsystem of the substation operated in optimization mode, and using the received sensitivity values to check whether the modification action would lead to an improvement in the operating state for the whole energy distribution system.

In respect of the advantages of the energy distribution system according to the invention, reference may be made to the aforementioned advantages of the method according to the invention, since the advantages of the energy distribution system according to the invention essentially correspond to those of the method according to the invention.

In order to allow the fastest possible reconfiguration of the energy distribution system, it is considered to be advantageous if the substations each have a communication device and can use this communication device to set up a communication link to one another, whether directly with one another or with the assistance of a superordinate central device.

Direct data transmission between the substations is regarded as advantageous, however, because it increases the transmission speed of the data and allows action to be taken in the energy distribution within the energy distribution system exclusively by components at the substation level, that is to say without the assistance of a superordinate central device.

The data transmitted between the substations can additionally also be transmitted to the superordinate central device in order to be able to rate and possibly control the respective prevailing configuration of the energy distribution system centrally too.

The invention additionally relates to a substation, particularly for an energy distribution system, as has already been described above.

The invention provides for the substation to have a computation device that is programmed such that the substation can be operated in an optimization mode in which it optimizes the operation of the whole energy distribution system by examining a modification action, which the substation could perform in the subsystem associated therewith, for its effect on the operating state of the whole energy distribution system by receiving from all or at least from the substation(s) affected by the modification action a respective substation-individual sensitivity value that indicates the change in the local operating state in the subsystem associated with the respective other substation if the modification action were to be executed in the subsystem of the substation operated in optimization mode, and using the received sensitivity values to check whether the modification action would lead to an improvement in the operating state for the whole energy distribution system.

In respect of the advantages of the substation according to the invention, reference may be made to the aforementioned advantages of the method according to the invention, since the advantages of the method according to the invention essentially correspond to those of the substation according to the invention.

The substations preferably each have a communication device and a computation device connected thereto.

The invention additionally relates to a central device, in particular for an energy distribution system as has been described above.

In this regard, the invention provides for the central device to have a computation device that is programmed such that the central device, following reception of an enquiry from a substation, uses further data, which are not available to the enquiring substation, to check whether a modification action defined in the enquiry is intended to be executed, and sends a confirmation signal to the enquiring substation if execution is intended to take place.

BRIEF DESCRIPTION OF THE SEVERAL VIEWS OF THE DRAWING

The invention is explained in more detail below using exemplary embodiments, for which, by way of example.

DESCRIPTION OF THE INVENTION

In the figures, the same reference symbols are always used for identical or comparable components for the sake of clarity.

Figure 1:
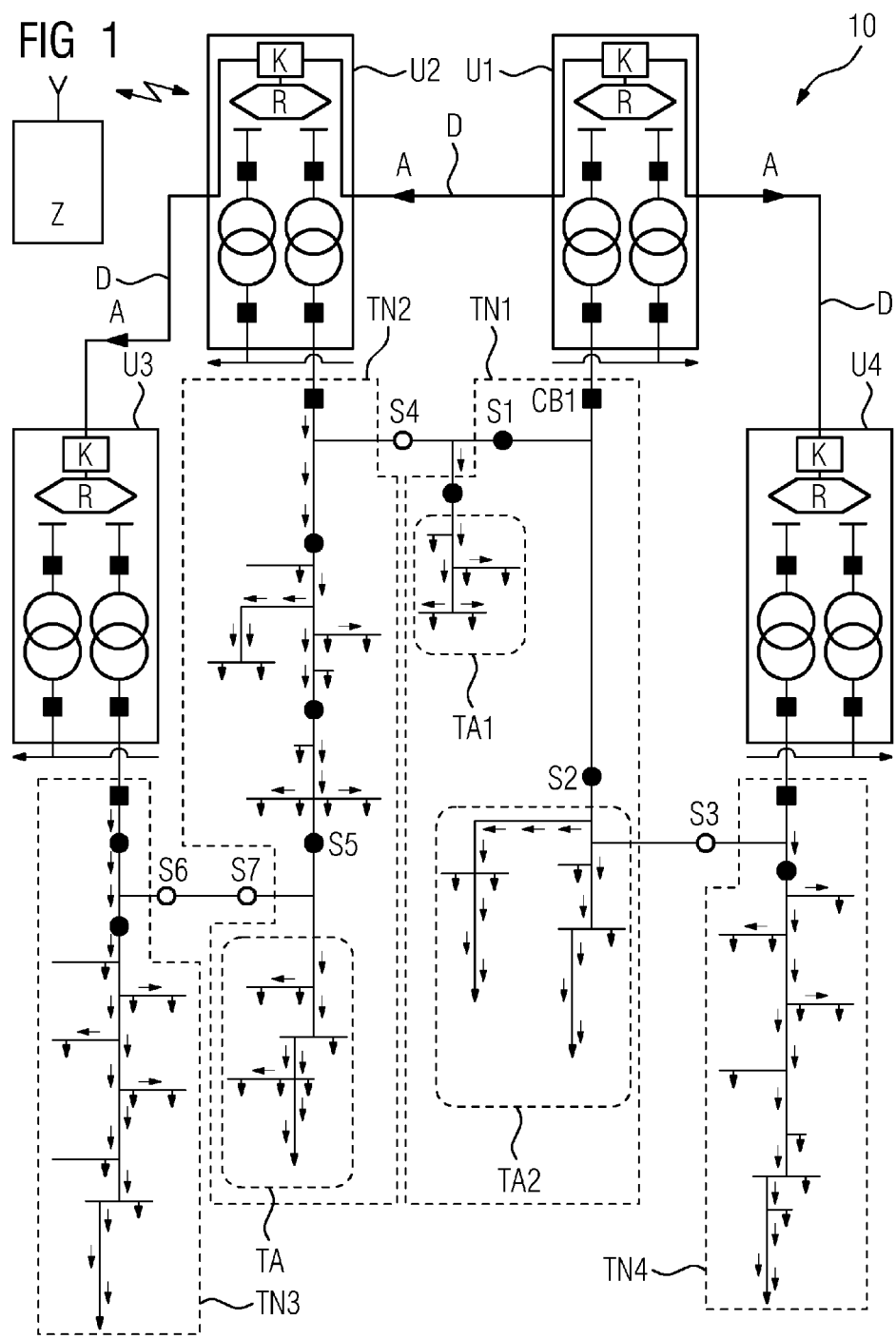
FIG. 1-5 show an energy distribution system that is used to explain an exemplary embodiment of the method according to the invention by way of example.

FIG. 1 reveals an energy distribution system 10, of which four subsystems TN1, TN2, TN3 and TN4 are shown in FIG. 1.

The first subsystem TN1 is supplied with electric energy by a substation U1 and has a first subsection TA1 and a second subsection TA2. The two subsections TA1 and TA2 of the first subsystem TN1 are electrically connected to the substation U1 via switched-on switches CB1, S1 and S2. The switched-on state (shown by black circles or squares in the figures) of the three switches CB1, S1 and S2 means that energy from the substation U1 can flow to the two subsections TA1 and TA2 and/or energy can be drawn from the subsections by the substation U1.

Correspondingly, the subsystems TN2, TN3 and TN4 are connected to the substations U2, U3 and U4 and can be supplied with energy by means of the latter. The subsystems TN2, TN3 and TN4 or the subsections thereof are connected to one another via switches S3, S4, S5, S6 and S7, inter alia; in the figures, closed switch states for these switches are represented by black circles and open switch states are represented by white circles.

The four substations U1, U2, U3 and U4 each have a communication device K that allows direct communication with other substations. The communication devices K each have a computation device R connected to them that is programmed such that it can execute the functions described below. The four substations U1, U2, U3 and U4 are connected to one another via data lines D, so that they can interchange data directly with one another via these data lines D. The four substations U1, U2, U3 and U4 are furthermore connected to a central device Z by wire or by radio.

The manner of operation of the energy distribution system 10 will now be explained in more detail below using an exemplary embodiment. In this case, it is assumed by way of example that the substation U1 is operated in an optimization mode in which it optimizes the operation of the whole energy distribution system 10 by examining a modification action, which the substation U1 could perform in the subsystem TN1 associated therewith, for its effect on the operating state of the whole energy distribution system 10.

In the state that is shown in FIG. 1 for the energy distribution system 10, the substation U1 supplies the two subsections TA1 and TA2 of the subsystem TN1 with energy. As part of the optimization of the operation of the whole energy distribution system 10, the substation U1 can check, by way of example, whether reconfiguration of the subsystems or reallocation of the subsections TA1 and TA2 to other subsystems than the subsystem TN1 could bring about an improvement in the overall state of the energy distribution system 10.

In order to establish this, the substation U1 can first of all check, by way of example, whether or not reallocation of the subsection TA1 to the subsystem TN2 of the substation U2 would prompt an improvement. Such a check may have the following appearance, for example:

In a first step, the substation U1 will send to all other substations U2, U3 and U4 in the energy distribution system 10 an enquiry signal A that is used to define the planned modification action, that is to say in this case the reallocation of the subsection TA1 from the subsystem TN1 to the subsystem TN2 of the substation U2.

Figure 2:
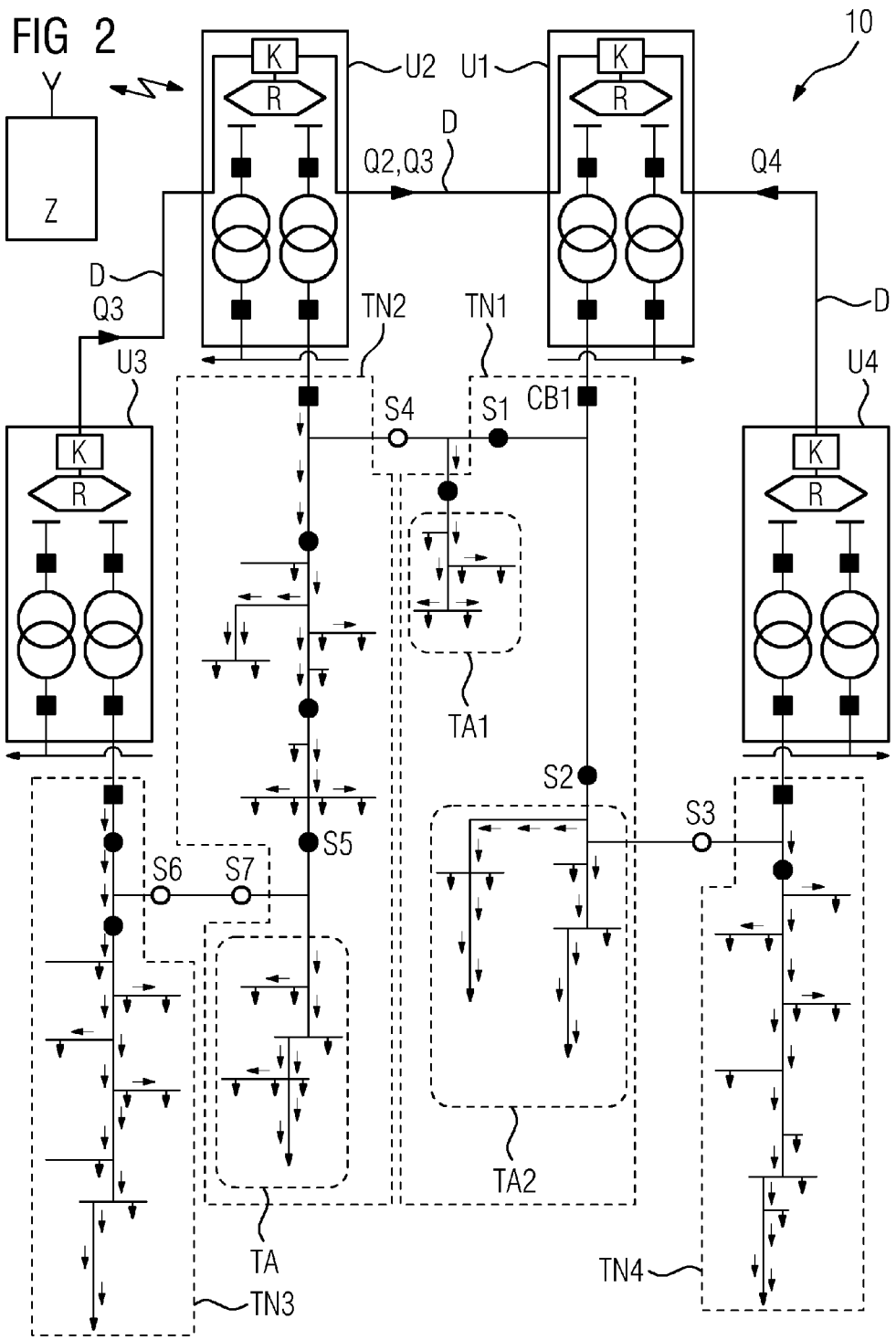

Following reception of the enquiry signal A, the substations U2, U3 and U4 will check what influence the planned modification action would have on their own subsystem TN2, TN3 or TN4. Accordingly, they will produce a substation-individual sensitivity value Q2, Q3 and Q4 that describes the influence of the reallocation of the subsection TA1 and will send it to the substation U1 operated in optimization mode (cf. FIG. 2). In this case, it is assumed by way of example that a positive substation-individual sensitivity value indicates an improvement in the local operating state in the subsystem supplied with energy by the respective substation and a negative substation-individual sensitivity value indicates a deterioration in the local operating state in the subsystem supplied with energy by the respective substation; this allocation is naturally only intended to be understood by way of example and can also be the other way around.

In order to form the substation-individual sensitivity values Q2, Q3 and Q4, the substations preferably use load and/or topology data that relate to the respective subsystem supplied with energy or to the whole energy distribution system. The load and/or topology data are interchanged by the substations preferably with one another and/or are received thereby from the central device.

By way of example, the substation-individual sensitivity values may be values that indicate the ratio between the energy consumed by the loads connected to the respective subsystem and the energy lost in the respective subsystem. Alternatively, they may be values that indicate the range of variation in the voltage in the respective subsystem or the range of variation in the frequency of the voltage in the respective subsystem.

Following reception of the substation-individual sensitivity values Q2, Q3 and Q4, the substation U1 is capable of checking whether the modification action or the reallocation of the subsection TA1 would be advantageous for the energy distribution system 10 on the whole and would lead to an improvement in the operating state. By way of example, the substation U1 will sum the substation-individual sensitivity values Q2, Q3 and Q4 and a substation-individual sensitivity value Q1 of its own, which describes the influence of the modification action on the subsystem TN1 operated by the substation U1, in weighted fashion to form an alteration value V, for example in accordance with $$V = \Sigma_{i=1}^{n} k_i Q_i$$

where n describes the number of substations (in this case n=4), Qi describes the substation-individual sensitivity value of the i-th substation and ki describes a substation-individual weighting value. The weighting value describes the influence of the i-th substation on the total state value of the whole energy distribution system 10. When substations have the same weight or subsystems have the same weight, the weighting value will be identical, for example, and will be 1 in each case, for example.

In order to form the substation-individual sensitivity value Q1, the substation U1 preferably uses load and/or topology data that relate to the respective subsystem supplied with energy or to the whole energy distribution system. The load and/or topology data are obtained by the substation U1 preferably from the central device.

By summing the substation-individual sensitivity values Q1 to Q4, it is possible to establish whether reallocation of the subsection TA1 is worthwhile: if the alteration value V is positive, an improvement arises and reallocation would be advantageous; if the alteration value V is zero or negative, on the other hand, then no improvement arises and reallocation would not be advantageous.

Additionally or alternatively, the substation U1 can determine a total state value Fg, describing the operating state of the whole energy distribution system 10, by computing the summation of the substation-individual sensitivity values by taking account of the total state value F1, describing the operating state of the whole energy distribution system 10, before the modification action is performed, in accordance with:

$$Fg = Fl + \Sigma_{i=1}^{n} k_i Q_i$$

If the substation U1 establishes that the total state value Fg deteriorates in comparison with the total state value F1 without the performance of the modification action, it will refrain from performing the modification action and alternatively check other measures that would prompt the improvement in the total state value of the energy distribution system 10 or alternatively terminate the optimization mode. By way of example, the substation U1 can check whether reallocation of the subsection TA2 of the subsystem TN1 to the subsystem TN4 of the substation U4 would be advantageous, as has been described above in connection with the reallocation of the subsection TA1.

On the other hand, if the substation U1 establishes that reallocation of the subsection TA1 to the subsystem TN2 is advantageous for the overall state of the energy distribution system 10 because the total state value Fg is greater than the total state value F1, it will prompt implementation of the modification action. In this regard, two alternative approaches are regarded as advantageous:

According to a first variant embodiment, the substation U1 will execute the modification action, that is to say in this case the reallocation of the subsection TA1 to the subsystem TN2, immediately as soon as it is established that the modification action leads to an improvement in the operating state for the whole energy distribution system 10.

Figure 3:
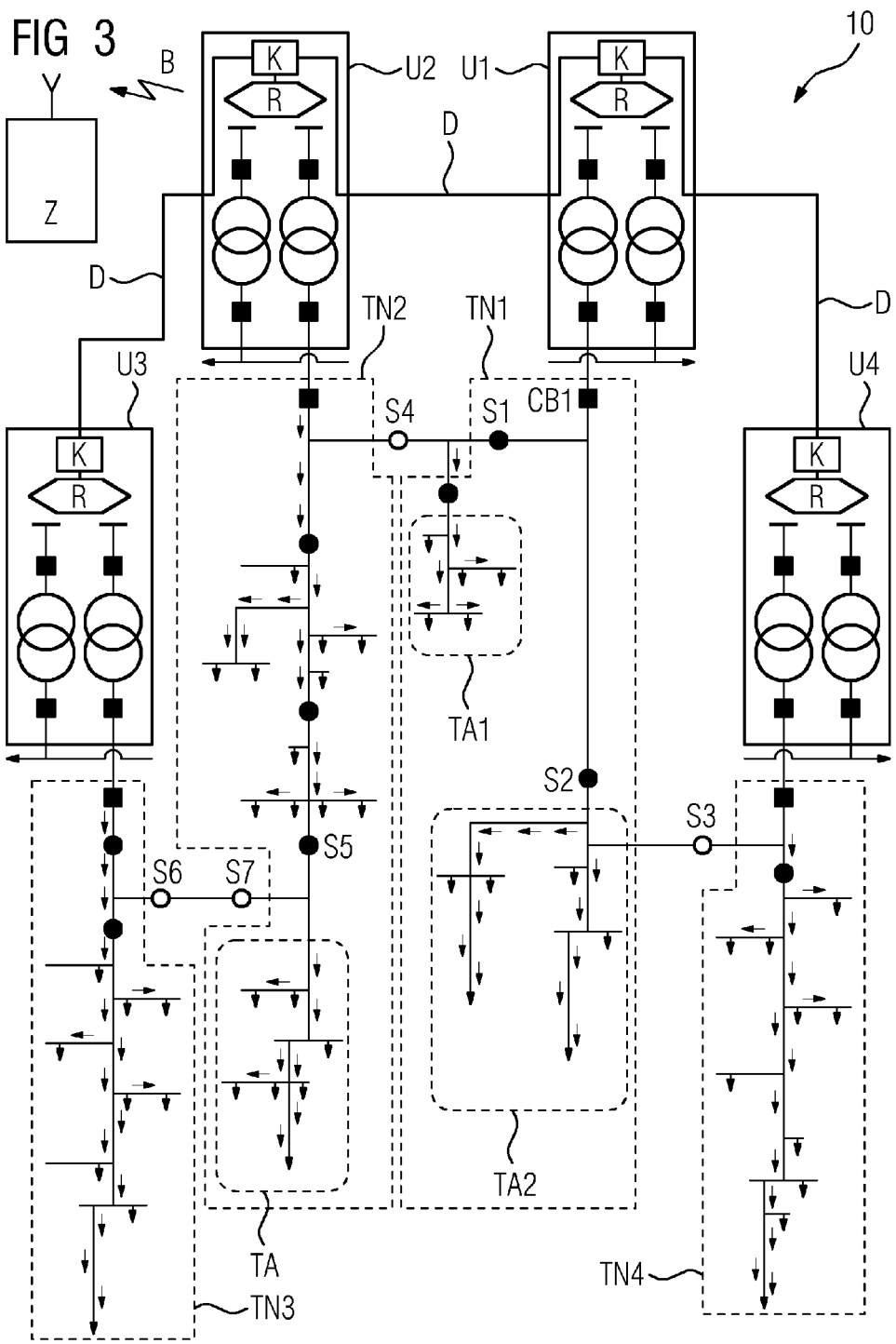

According to a second variant embodiment, the substation U1 can first of all send an enquiry B to the superordinate central device Z that is used to enquire whether or not the modification action is intended to be executed (cf. FIG. 3). Following reception of the enquiry B, the superordinate central device Z will check whether the modification action is intended to be executed. In checking this issue, the central device Z will preferably use further data, which are not available to the enquiring substation U1.

Figure 4:
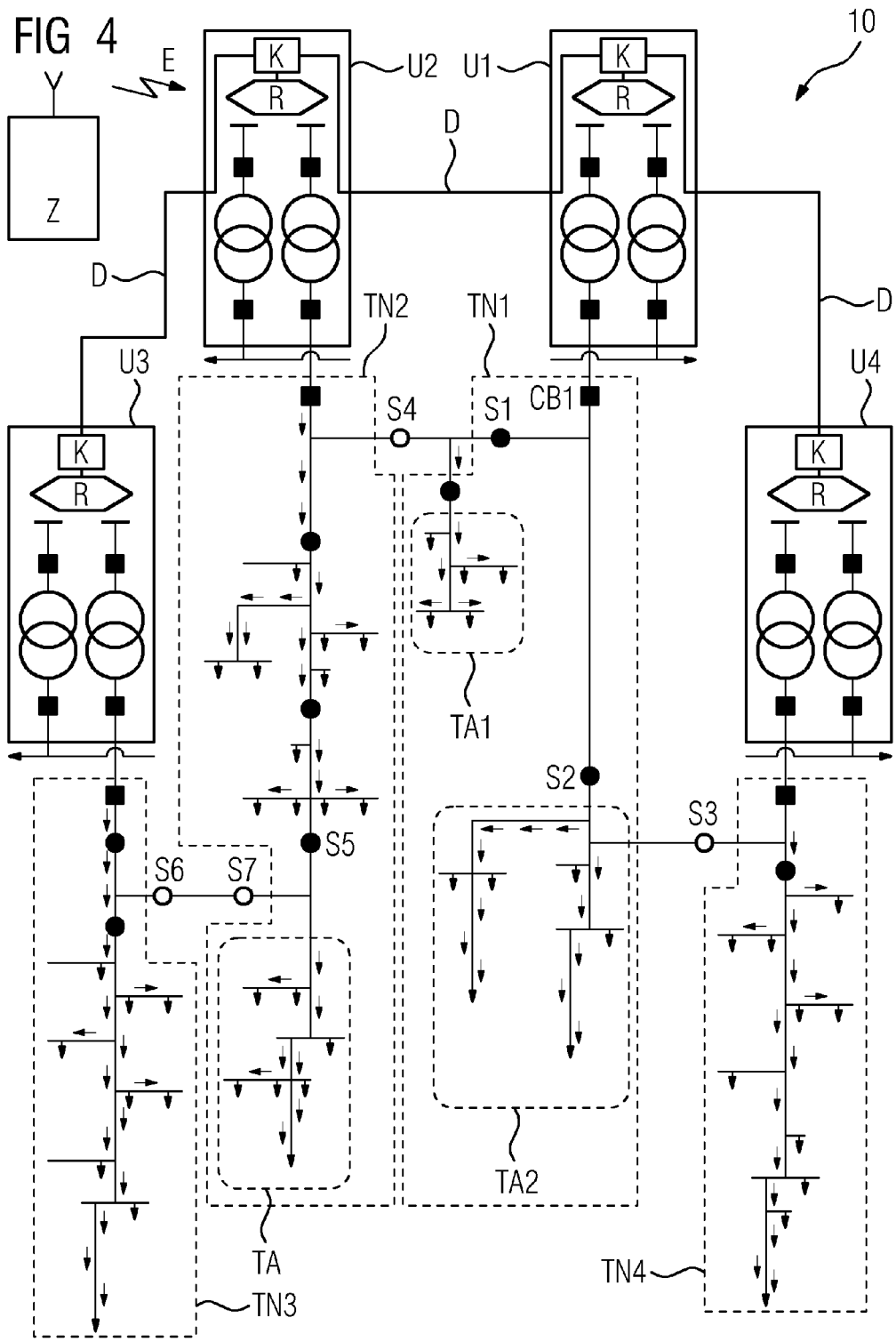

If the modification action is intended to be performed, the central device Z will send a confirmation signal E to the enquiring substation U1 that is used to approve implementation of the modification action (cf. FIG. 4). Otherwise, the central device Z will send a signal that is used to prohibit implementation.

Figure 5:
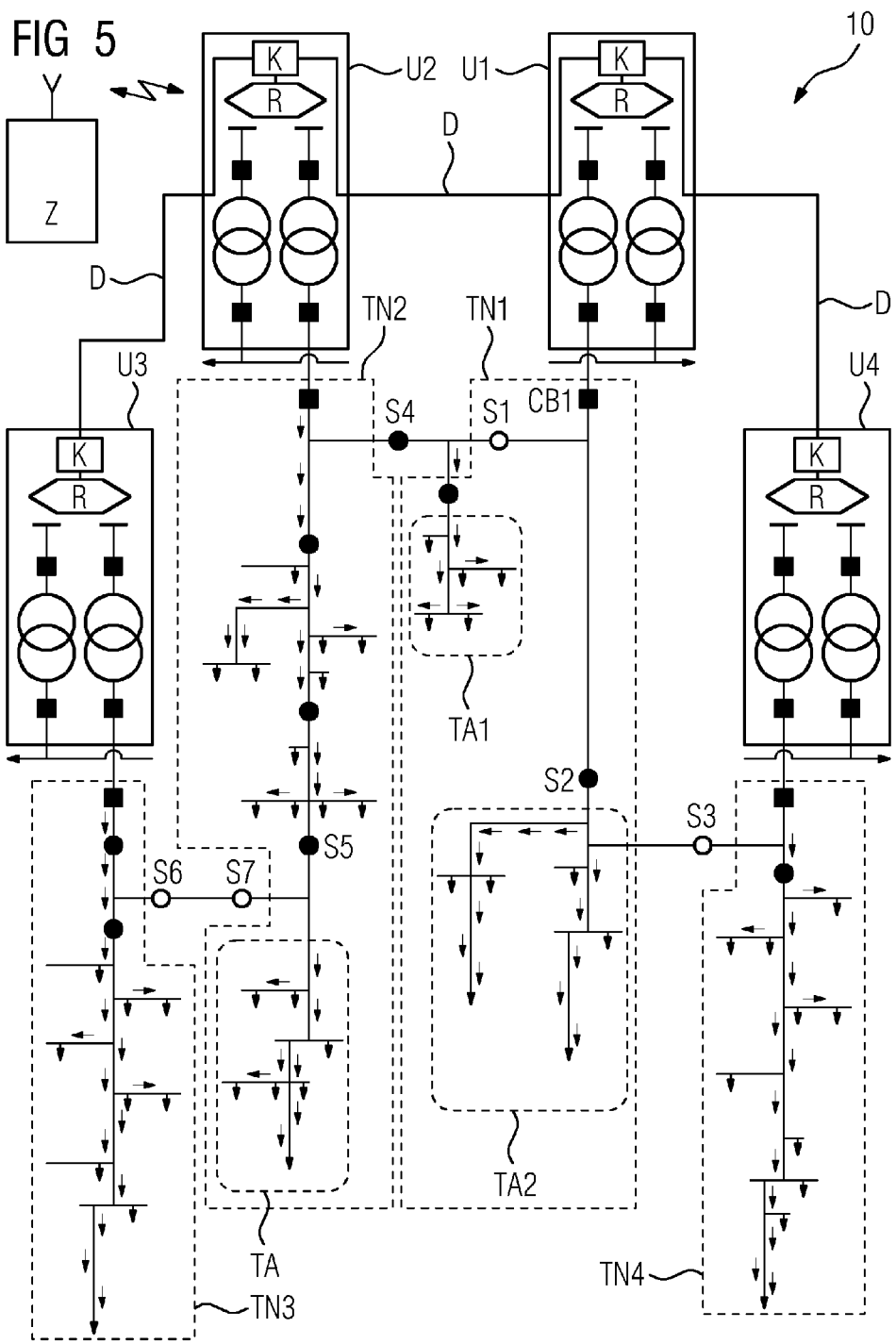

After the substation U1 has obtained the confirmation signal E, it will switch off the switch S1 in the subsystem TN1 and ask the substation U2 to close the switch S4 so that the supply of energy to the subsection TA1 can be continued via the substation U2. The energy distribution system 10 after the allocation of the subsection TA1 to the subsystem TN2 is shown in FIG. 5.

In the exemplary embodiment shown in FIGS. 1 to 5, it has been assumed by way of example that a modification action consists in complete reallocation of subsections from one substation to another substation. Alternatively, it is also possible for other modification actions to be quantitatively recorded and evaluated in the manner described. By way of example, the subsection TA1 of the subsystem TN1 could also be supplied with energy by the two substations U1 and U2 proportionately instead of allocating said subsection completely to the substation U2.

This will be explained in more detail below with reference to FIGS. 6-8 using a further exemplary embodiment, in which ΔC indicates the ratio in which the supply of energy to the subsection TA1 would be effected proportionately by the substation U2 if the modification action involves partial reconfiguration. The value ΔC is therefore a measure of the scope of the modification action that the substation U1 analyzes. In this case, a value ΔC=1 would correspond to complete reallocation of the subsection TA1 to the substation U2, as has been discussed above in connection with FIGS. 1-5; a value ΔC=0.5 would mean that both substations U1 and U2 would each supply half of the energy to the subsection TA1, etc.

Figure 6:
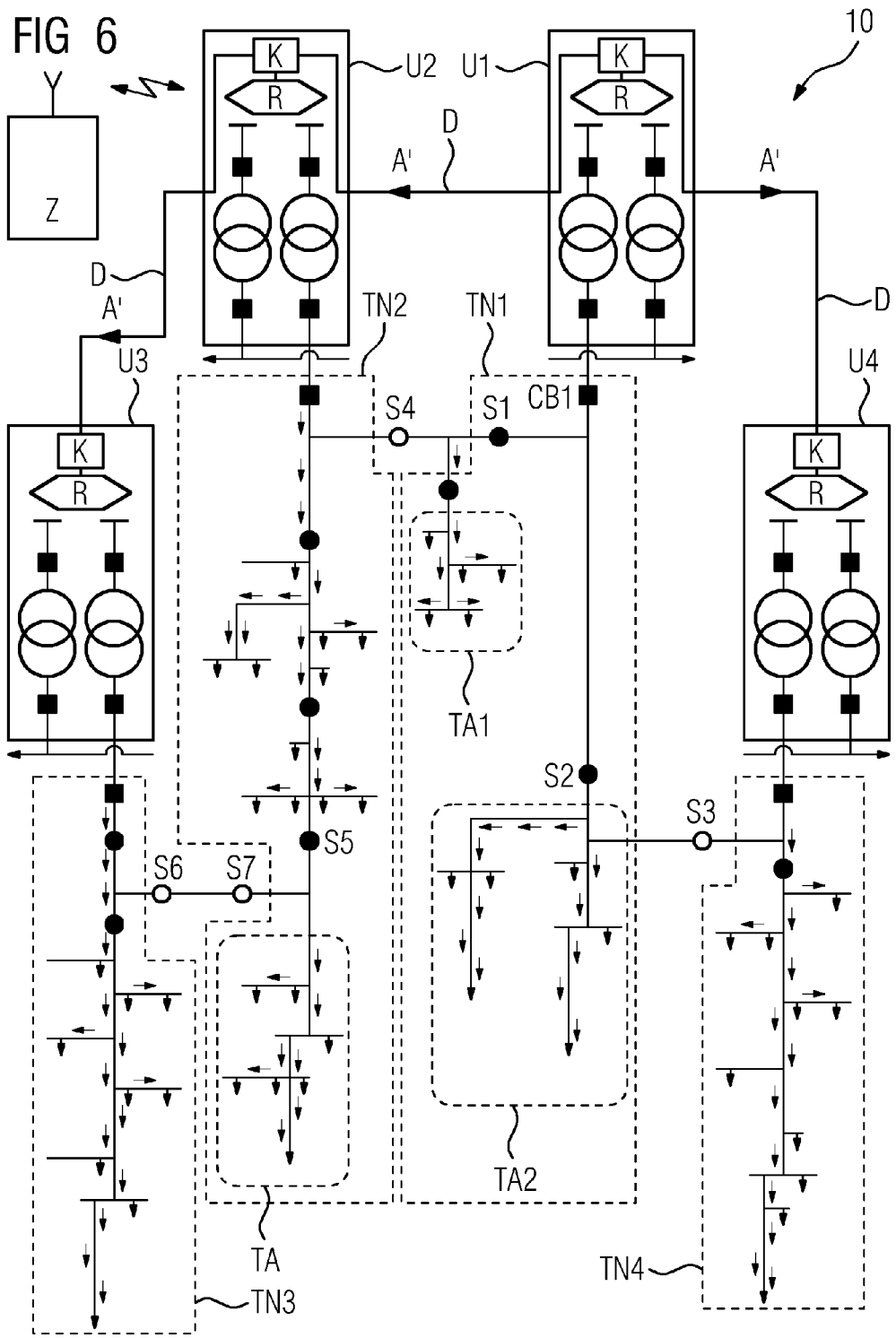
FIG. 6-8 show an energy distribution system that is used to explain a further exemplary embodiment of the method according to the invention by way of example.
Figure 7:
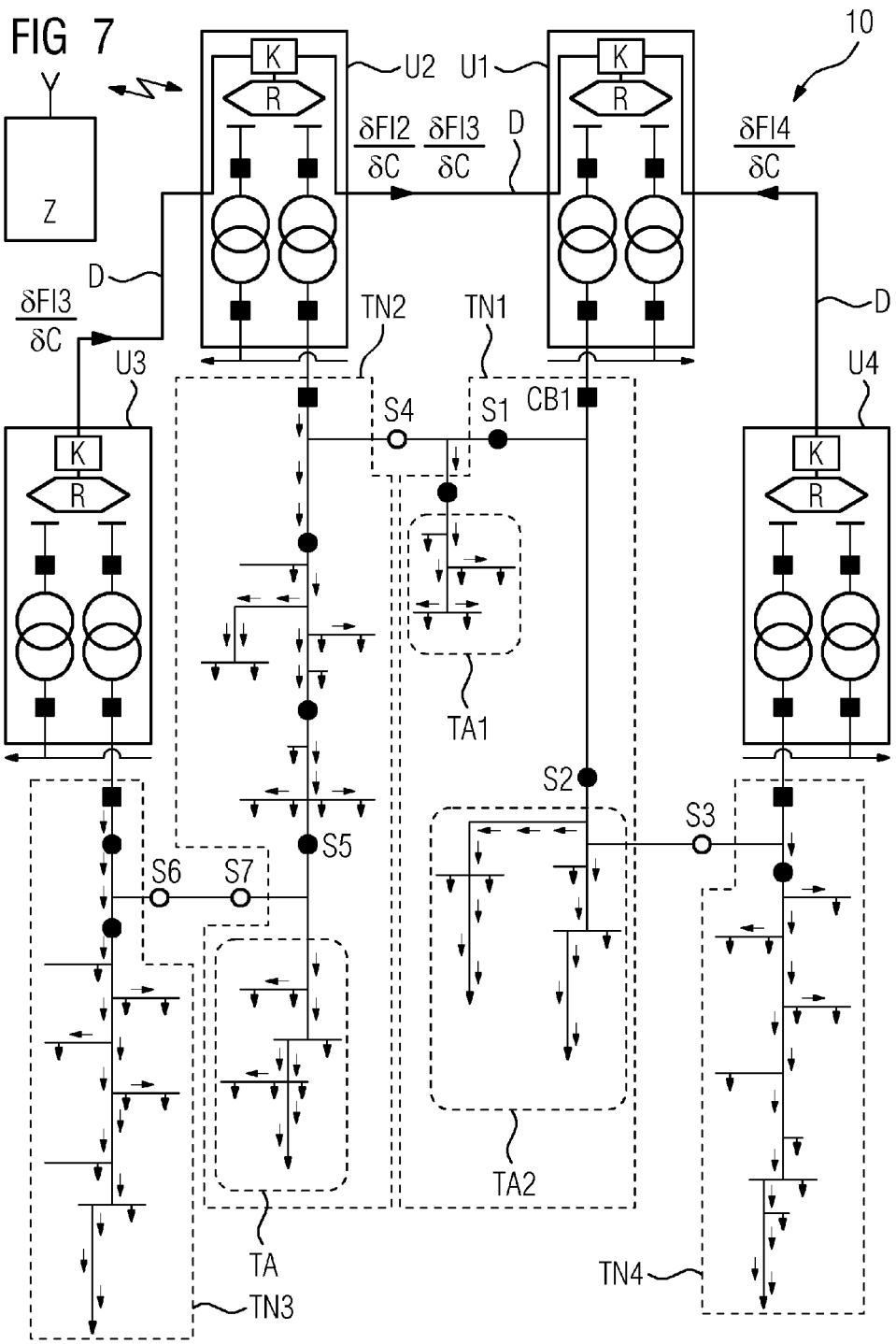

As FIG. 6 shows, the substation U1 will send to all other substations U2, U3 and U4 of the energy distribution system 10, in a first step, an enquiry signal A' that is used to define the planned modification action, that is to say in this case a proportionate reallocation of the subsection TA1 for the subsystem TN1 to the subsystem TN2 of the substation U2.

Following reception of the enquiry signal A', the substations U2 to U4 will check what influence the planned modification action would have on their own subsystem TN2, TN3 or TN4. Accordingly, they will produce a sensitivity value ∂Fli/∂C based on the scope ΔC of the alteration and will send it to the substation U1 operated in optimization mode (cf. FIG. 7). The substation-individual sensitivity value ∂FLi/∂C indicates what influence reallocation of the subsection TA1 would have, specifically based on the extent of the alteration ΔC. In contrast to the exemplary embodiment shown in FIGS. 1-5, the exemplary embodiment shown in FIGS. 6-8 involves the formation of sensitivity values based on the extent of the alteration rather than absolute sensitivity values.

Multiplying the value ΔC, which indicates the respective extent of the alteration, by the respective sensitivity value ∂FLi/∂C, which is based on the extent or the scope ΔC of the alteration, gives the resulting absolute substation-individual sensitivity value $$\frac{\partial Fli}{\partial C} \Delta C,$$

which quantitatively indicates the influence of the partial reallocation of the subsection TA1. For a value ΔC=1, the absolute substation-individual sensitivity values Qi would be obtained in accordance with the exemplary embodiment explained with reference to FIGS. 1-5.

Following reception of the sensitivity values ∂FLi/∂c, which are based on the extent ΔC of the alteration, the substation U1 is capable of checking whether the modification action or the partial reallocation of the subsection TA1 would be advantageous for the energy distribution system 10 on the whole and would lead to an improvement in the operating state. By way of example, the substation U1 will sum the sensitivity values ∂Fl2/∂C, ∂Fl3/∂C and ∂Fl4/∂C, which are based on the scope ΔC of the alteration, and a substation-individual sensitivity value of its own ∂Fl1/∂C (which is based on the extent or the scope of the alteration) that describes the influence of the modification action on the subsystem TN1 operated by the substation U1 in weighted fashion to form an alteration value V, for example in accordance with $$V = + \sum_{i=1}^{n} k_i \frac{\partial Fli}{\partial C} \Delta C$$

where n describes the number of substations (in this case n=4), ∂Fli/∂ac describes the substation-individual sensitivity value, based on the scope of the alteration, of the i-th substation, ΔC describes the extent of the alteration and ki describes a substation-individual weighting value that indicates the influence of the i-th substation on the total state value of the whole energy distribution system 10.

The summation makes it possible to establish whether partial reallocation of the subsection TA1 is worthwhile: if the alteration value V is positive, an improvement arises and reallocation would be advantageous; if the alteration value V is zero or negative, on the other hand, then no improvement arises and reallocation would not be advantageous.

Figure 9:
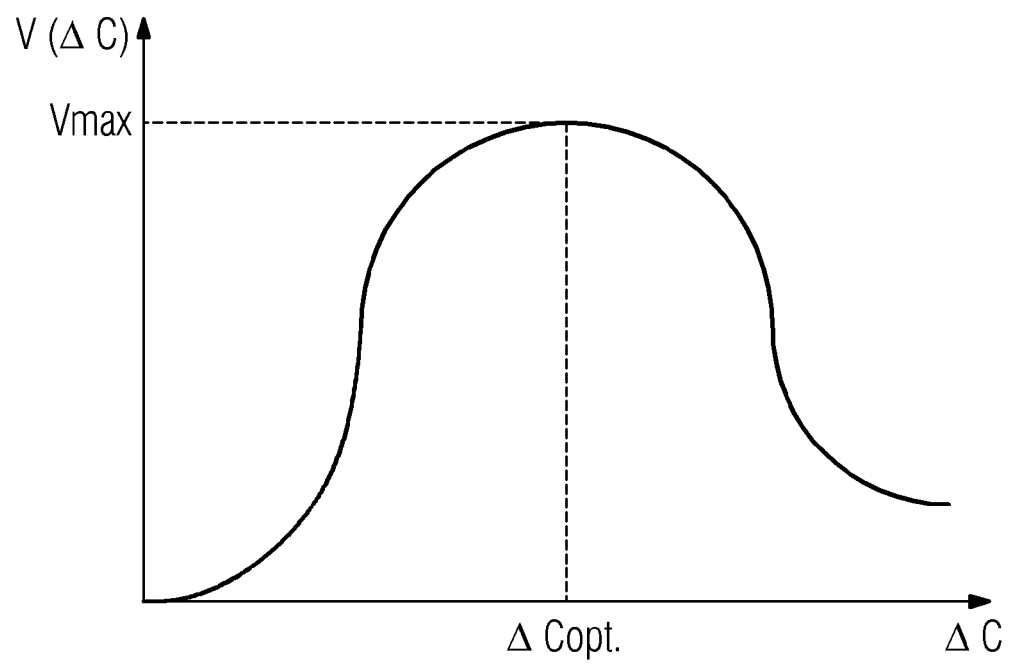
FIG. 9 shows an example of the trend in an alteration value over the extent of the alteration of a modification action.

Furthermore, it is possible to determine an optimum value for ΔC and therefore to ascertain how the distribution of the energy supply for the subsection TA1 to the two substations U1 and U2 would be optimum. The optimum value for ΔC is that value for which V is maximized or optimized. FIG. 9 shows an example of a trend for the alteration value V over the extent of the alteration ΔC. It can be seen that in the example shown in FIG. 9 the alteration value V is maximized at ΔC=ΔCopt and assumes the value Vmax; this means that the operating state of the whole energy distribution system 10 is optimized.

Additionally or alternatively, the substation U1 can determine a total state value Fg, describing the operating state of the whole energy distribution system 10, by computing the summation of the substation-individual sensitivity values by taking account of the total state value F1, describing the operating state of the whole energy distribution system 10, before the modification action is performed, in accordance with:

$$Fg = Fl + \sum_{i=1}^{n} k_i \frac{\partial Fli}{\partial C} \Delta C$$

If the substation U1 establishes that the total state value Fg deteriorates in comparison with the previous total state value F1 without performance of the modification action, it will refrain from performing the modification action and check other measures that would prompt an improvement in the total state value of the energy distribution system 10 or alternatively terminate the optimization mode.

On the other hand, if the substation U1 establishes that partial reallocation of the subsection TA1 to the subsystem TN2 is advantageous for the overall state of the energy distribution system 10 because the total state value Fg is greater than the total state value F1, it will prompt the implementation of the modification action, as has already been explained by way of example above. In this case, it will choose a energy distribution from the two substations U1 and U2 preferably in such a way, or will set the value ΔC in such a way, that Fg is maximized or optimized.

In order to form the substation-individual sensitivity values ∂Fli/∂C, the substation U1 to U4 will preferably use load and/or topology data that relate to the respective subsystem supplied with energy or to the whole energy distribution system. The load and/or topology data are obtained by the substation U1 from the central device Z, for example.

In order to be able to realize the functionality of the substations U1 to U4 that is described above in a simple manner, said substations are preferably equipped with computation devices R that are programmed such that they can operate as described. Specifically, the computation device R of the substation U1 will preferably be programmed such that it can look into and evaluate absolute substation-individual sensitivity values and/or substation-individual sensitivity values based on the scope of the alteration from other substations and, following evaluation of the received substation-individual sensitivity values, can prompt or at least initiate alteration of the energy distribution system if such alteration has been identified as advantageous following evaluation of the substation-individual sensitivity values.

The computation devices R of the substations U1 to U4 are preferably embodied such that in the case of an incoming enquiry signal A or A' they are capable of forming a respective absolute or relative (or based on the extent of the alteration) substation-individual sensitivity value that indicates the influence of a planned alteration on the local operating state in the respective subsystem associated with the substation.

Figure 8:
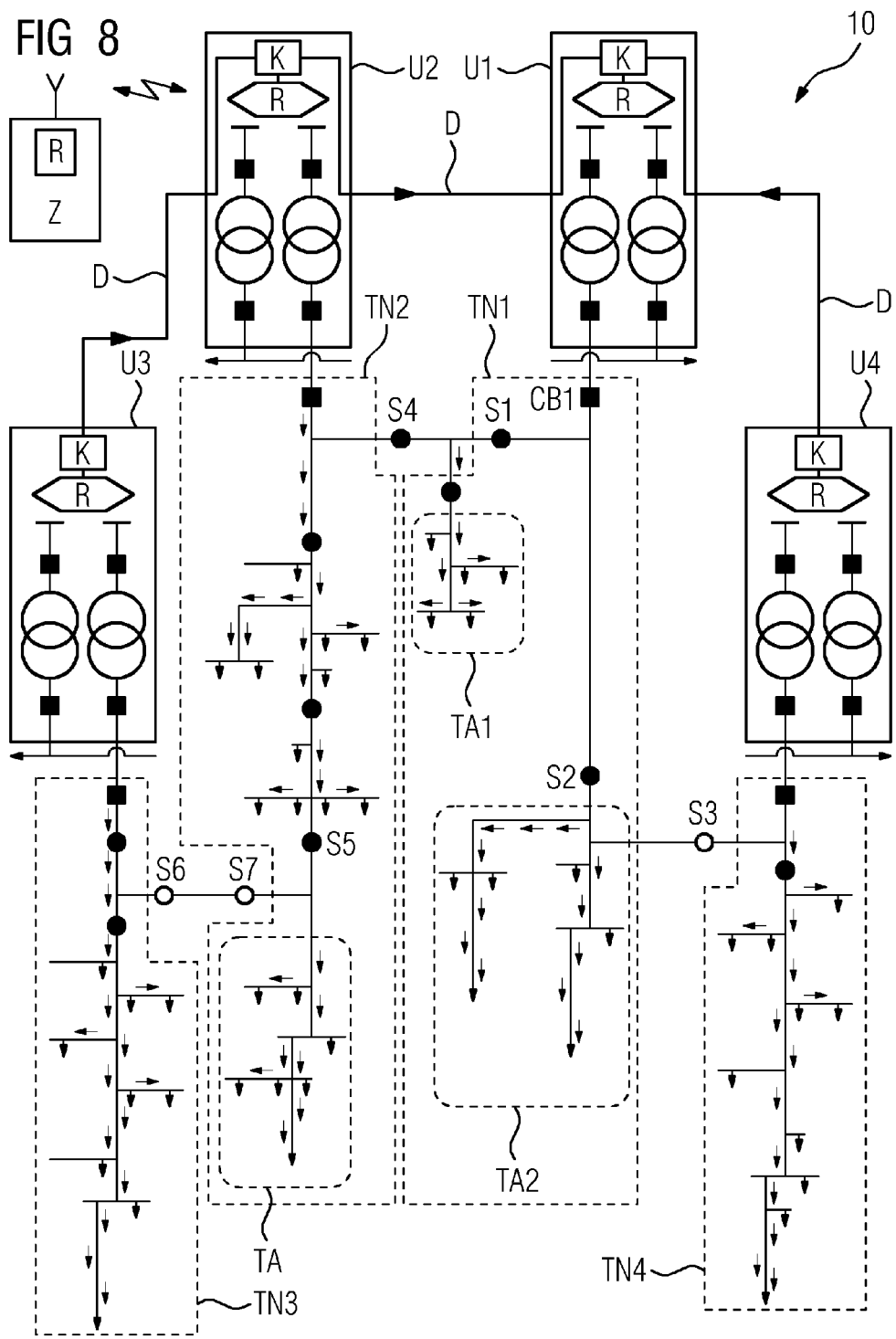

The central device Z is preferably likewise equipped with a computation device R (cf. FIG. 8). Said computation device is preferably programmed such that following reception of an enquiry from a substation it uses further data, which are not available to the enquiring substation, to check whether a modification action defined in the enquiry is intended to be executed and sends a confirmation signal to the enquiring substation if this is the case.

The substations U2 to U4 will preferably operate in precisely the same manner as the substation U1 and each likewise attempt, as part of an optimization mode, to improve the operating state of the whole energy distribution system overall. The substations U1 to U4 will execute the optimization cycles preferably in temporal succession (e.g. triggered by the central device Z) in order to avoid a collision between the optimization efforts.

Although the invention has been illustrated and described in more detail by means of preferred exemplary embodiments, the invention is not restricted by the disclosed examples and other variations can be derived therefrom by a person skilled in the art without departing from the scope of protection of the invention.

LIST OF REFERENCE SYMBOLS

10 Energy distribution system
A Enquiry signal
A' Enquiry signal
B Enquiry
ΔC Extent of the alteration
CB1 Switch
D Data line
E Confirmation signal
Fg Total state value
F1 Total state value
K Communication device
Q1 Sensitivity value
Q2 Sensitivity value
Q3 Sensitivity value
Q4 Sensitivity value R Computation device
S1-S7 Switch
TA1 Subsection
TA2 Subsection
TN1 Subsystem
TN2 Subsystem
TN3 Subsystem
TN4 Subsystem
U1 Substation
U2 Substation
U3 Substation
U4 Substation
V Alteration value
Z Central device
∂Fl1/∂C Substation-individual sensitivity value
∂Fl2/∂C Substation-individual sensitivity value
∂Fl3/∂C Substation-individual sensitivity value
∂Fl4/∂C Substation-individual sensitivity value

The invention claimed is:

1. A method for operating an energy distribution system in which energy is fed through substations into subsystems and a distribution of the energy is monitored by way of a central device that is superordinate to the substations, the method comprising:
    operating at least one of the substations in an optimization mode wherein the at least one substation optimizes an operation of the entire energy distribution system by examining a modification action, which the at least one substation could perform in a subsystem associated therewith, for an effect on the operating state of the entire energy distribution system, and thereby:
    sending from the at least one substation operated in optimization mode to one or more respective substations affected by the modification action an enquiry signal that defines the modification action;
    receiving by the at least one substation operated in optimization mode from the one or more respective substations affected by the modification action a respective substation-individual sensitivity value that indicates a change in a local operating state in the subsystem associated with the respective other substation if the modification action were to be executed in the subsystem of the at least one substation being operated in the optimization mode; and
    checking whether the modification action would lead to an improvement in the operating state for the entire energy distribution system based on the received sensitivity values by the at least one substation being operated in the optimization mode;
    wherein said checking comprises at least one of:
    summing the substation-individual sensitivity values with a sensitivity value of the at least one substation operated in optimization mode, and
    forming a total state value that describes the operating state of the entire energy distribution system based on the substation-individual sensitivity values and a sensitivity value of the at least one substation operated in optimization mode.

2. The method according to claim 1, wherein said summing further comprises determining an alteration value V, in accordance with:

$$V = \sum_{i=1}^{n} k_i \frac{\partial Fli}{\partial C} \Delta C$$

where:
    n describes the number of substations;
    ∂Fli/∂C describes a substation-individual sensitivity value, which is based on an extent of the alteration, for an i-th substation;
    ΔC describes the extent of the alteration of the modification action; and
    $k_i$ describes a substation-individual weighting value that indicates an influence of the i-th substation on the total state value.

3. The method according to claim 1, wherein said forming further comprises determining a total state value that describes the operating state of the entire energy distribution system, in accordance with:

$$Fg = Fl + \sum_{i=1}^{n} k_i \frac{\partial Fli}{\partial C} \Delta C$$

where:
    Fg describes the total state value following performance of the modification action;
    Fl describes the total state value before performance of the modification action; n describes the number of substations;
    ∂Fli/∂C describes the substation-individual sensitivity value of an i-th substation; and
    $k_i$ describes a substation-individual weighting value that indicates the influence of the i-th substation on the total state value.

4. The method according to claim 1, wherein the substation-individual sensitivity value is a value that indicates one of the following:
    a ratio between the energy that is consumed by loads connected to the subsystem of the respective substation and the energy lost in the respective subsystem; or
    a range of variation in a voltage in the subsystem associated with the respective substation; or
    a range of variation in a frequency of the voltage in the subsystem associated with the respective substation.

5. The method according to claim 1, which further comprises:
    executing with the at least one substation being operated in optimization mode the modification action if the at least one substation establishes that the modification action leads to an improvement in the operating state for the entire energy distribution system.

6. The method according to claim 1, which further comprises: if the at least one substation being operated in optimization mode establishes that the modification action would lead to an improvement in the operating state for the entire energy distribution system, sending from the at least one substation being operated in optimization mode an enquiry to the superordinate central device whether or not the modification action should be executed.

7. The method according to claim 6, which further comprises: following a receipt of the enquiry by the superordinate central device, checking whether the modification action should be executed based on further data in the superordinate central device that are not available to the substation sending the enquiry, and, if the modification action should be executed, sending a confirmation signal from the superordinate central device to the enquiring substation.

8. The method according to claim 1, which further comprises:

sending from the at least one substation being operated in optimization mode to all substations an enquiry signal that is used to define the modification action intended to be executed in the subsystem of the at least one substation being operated in optimization mode;

checking, in each of the substations what influence the planned modification action would have on its own subsystem, to produce a substation-individual sensitivity value describing the influence and sending the substation-individual sensitivity value to the at least one substation being operated in optimization mode;

and receiving, by the at least one substation being operated in optimization mode, the substation-individual sensitivity values from a remainder of the substations and producing a total state value describing the operating state of the entire energy distribution system based on the substation-individual sensitivity values.

9. The method according to claim 1, wherein the total state value formed for the whole energy distribution system is a value that indicates:
a ratio between an energy consumed by the loads connected to the energy distribution system and an energy lost in the energy distribution system; or
a range of variation in a voltage in the energy distribution system; or
a range of variation in a frequency of the voltage in the energy distribution system.

10. An energy distribution system, comprising:
a plurality of substations each configured to supply a subsystem of the energy distribution system with energy;
a central device superordinate to said substations;
at least one of said substations being configured for operation in an optimization mode for potentially optimizing an operation of the entire energy distribution system by examining an effect which a modification action, to be performed by said at least one substation in a respective said subsystem associated therewith, would have on the operating state of the whole energy distribution system, said at least one of said substations being configured to:
send to all of said substations, or at least to said substations affected by the modification action, an enquiry signal that defines the modification action;
receive from all of said substations, or at least from said substations affected by the modification action, a respective substation-individual sensitivity value that indicates a change in a local operating state in said subsystem associated with the respective other substation if the modification action were to be executed in the subsystem of said at least one substation being operated in the optimization mode;
and check whether the modification action would lead to an improvement in the operating state of the whole energy distribution system, based upon the sensitivity values thus received and a sensitivity value of the least one substation operated in optimization mode, which describes the influence of the modification on the subsystem associated with said substation operated in optimization mode;

wherein said check comprises at least one of:
summing the substation-individual sensitivity values with the sensitivity value of the at least one substation operated in optimization mode; and
forming a total state value that describes the operating state of the entire energy distribution system based on the substation-individual sensitivity values and the sensitivity value of the at least one substation operated in optimization mode.

11. A substation for an energy distribution system with a plurality of substations and subsystems associated with said substations, the substation comprising:
a computation device programmed for operating the substation in an optimization mode, wherein the substation optimizes an operation of the energy distribution system by examining a modification action, to be performed by the substation in a subsystem associated therewith, for an effect thereof on an operating state of the whole energy distribution system by:
sending to all substations, or at least to one or more substations affected by the modification action, an enquiry signal that defines the modification action;
receiving from all substations, or at least from one or more substations affected by the modification action, a respective substation-individual sensitivity value that indicates a change in a local operating state in the subsystem associated with the respective other substation if the modification action were to be executed in the subsystem of the at least one substation being operated in optimization mode;
and checking whether the modification action would lead to an improvement in the operating state for the whole energy distribution system, based upon the received sensitivity values;
wherein said checking comprises at least one of:
summing the substation-individual sensitivity values with a sensitivity value of the at least one substation operated in optimization mode; and
forming a total state value that describes the operating state of the entire energy distribution system based on the substation-individual sensitivity values and the sensitivity value of the at least one substation operated in optimization mode.

12. The substation according to claim 11 configured for integration in the energy distribution system according to claim 10.

13. A central device for an energy distribution system according to claim 10, the central device comprising:
a computation device programmed to cause the central device, following a receipt of an enquiry from a substation, to use further data that are not available to the enquiring substation, to check whether a modification action defined in the enquiry is to be executed, and to send a confirmation signal to the enquiring substation if execution of the modification action is intended to take place.

* * * * *